Jan. 24, 1956 C. E. HUNZIKER 2,732,079
HOLLOW LEAF PRESSURE FILTER
Original Filed Dec. 9, 1946 5 Sheets-Sheet 1
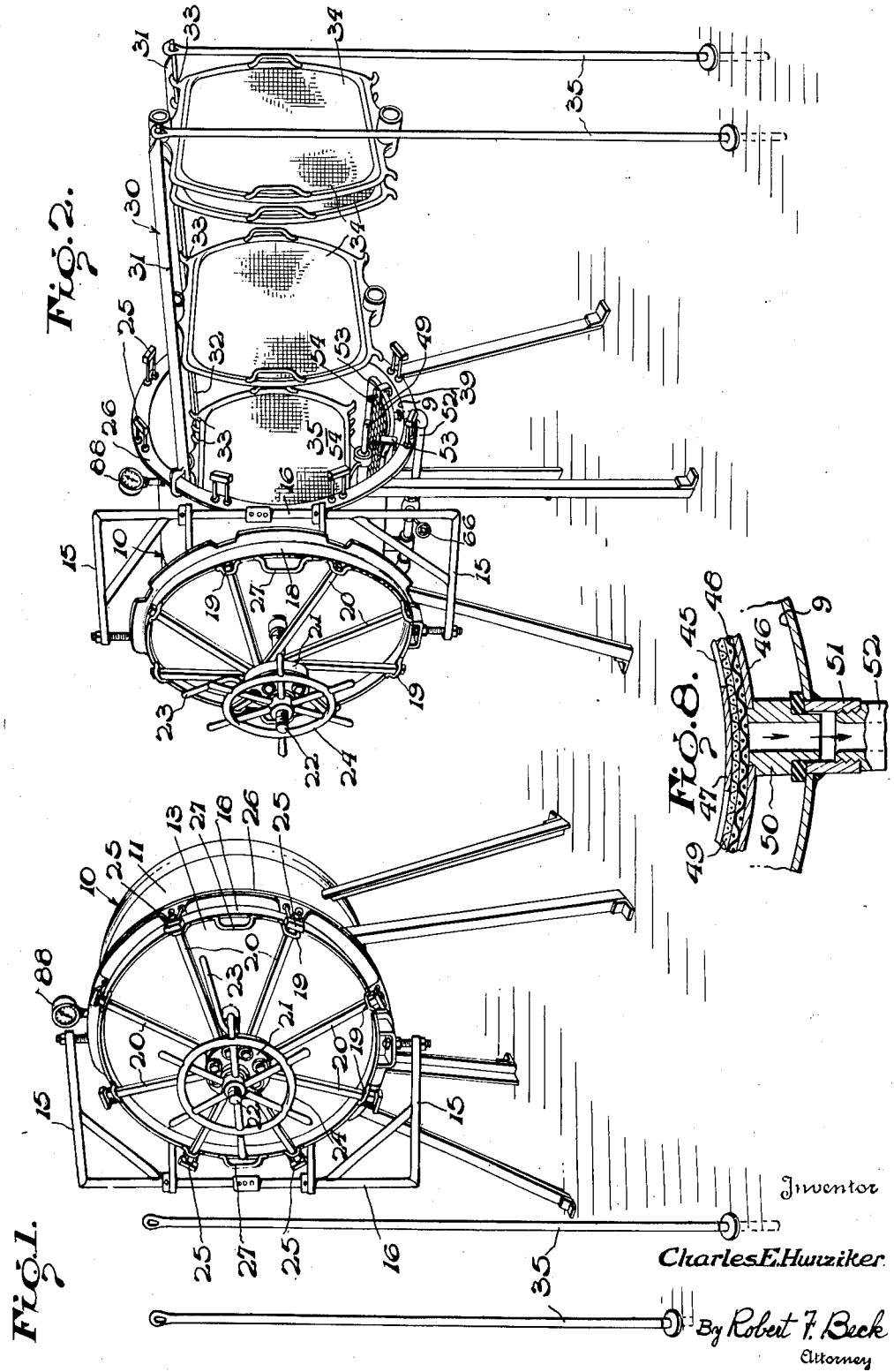
Inventor
Charles E. Hunziker
By Robert F. Beck
Attorney Jan. 24, 1956  C. E. HUNZIKER  2,732,079
HOLLOW LEAF PRESSURE FILTER
Original Filed Dec. 9, 1946  5 Sheets-Sheet 3
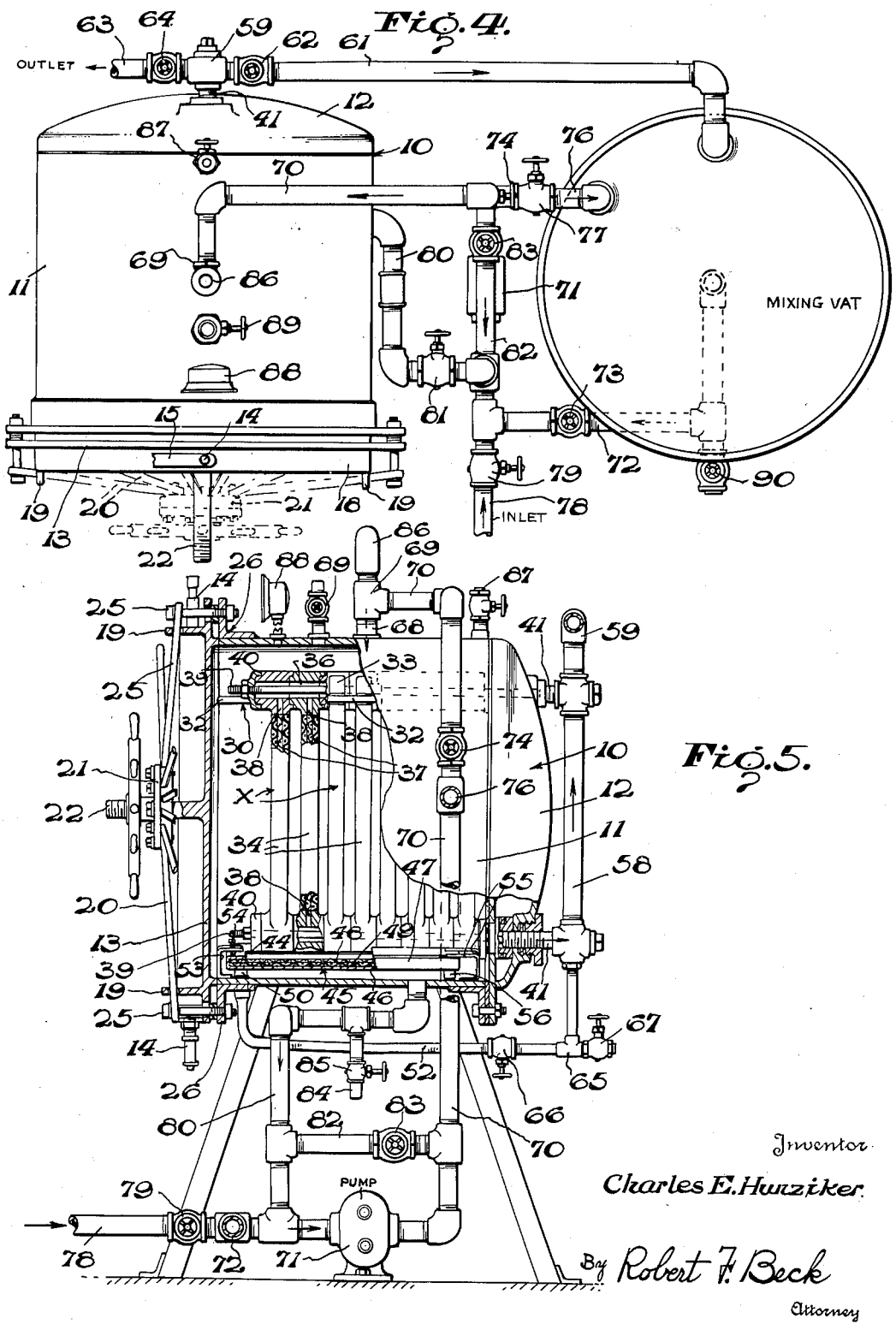
Inventor
Charles E. Hunziker
By Robert F. Beck
Attorney Jan. 24, 1956　　　C. E. HUNZIKER　　　2,732,079
HOLLOW LEAF PRESSURE FILTER
Original Filed Dec. 9, 1946　　　　　　　　5 Sheets-Sheet 4

Inventor
Charles E. Hunziker
By Robert F. Beck
Attorney

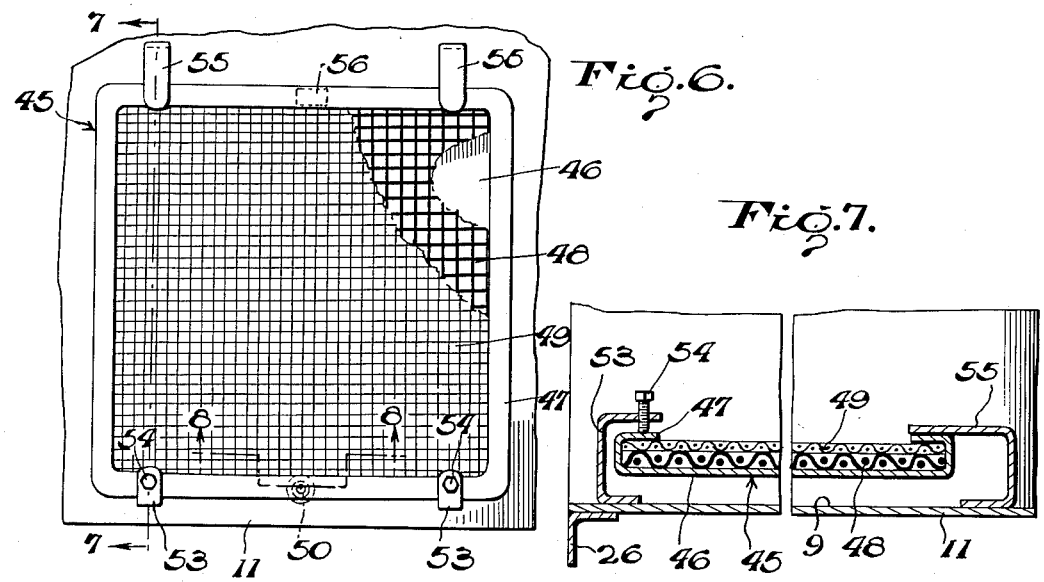

United States Patent Office 2,732,079
Patented Jan. 24, 1956

2,732,079
HOLLOW LEAF PRESSURE FILTER

Charles E. Hunziker, Ridgewood, N. J.

Continuation of abandoned application Serial No. 715,094, December 9, 1946. This application April 28, 1954, Serial No. 426,071

5 Claims. (Cl. 210—182)

My invention relates to filters and more particularly to alluvial or pressure-leaf filters, this application being a continuation of my application serial No. 715,094 filed December 9, 1946, now abandoned.

In alluvial or pressure-leaf filters, for instance, of the type disclosed in my U. S. Patent No. 2,381,453, a filter pack is provided which comprises a plurality of filter leaves or elements vertically suspended within a horizontally disposed cylindrical tank having a door at one end and which is closed and sealed during a filtering operation and opened to permit removal of the leaves for stripping or peeling and the cleaning of the tank. The leaves are spaced slightly above the bottom of the tank and define a sump for accumulating residue or the heel of the produce filtered, the sump being cleaned of the residue or heel upon completion of a filtering operation and in some instances without removing the leaves. Inasmuch as the residue removed from the sump contains an appreciable quantity of fluid capable of being filtered for mixing with the fluid previously filtered by the pack, it has been proposed to equip the tank with a fixed filtering element or heel leaf disposed between the bottoms of the tank and the leaves of the pack for use after filtering of fluid by the pack.

However, the provision of a fixed heel leaf is objectionable because it precludes adequate cleaning of the sump and, in instances where the fluid is of such a character, for instance, varnish, as to quickly solidify when exposed to the atmosphere, it necessitates a somewhat long and arduous task to effect removal of the solidified matter thus increasing production costs and waste.

My invention overcomes the foregoing difficulties and disadvantages, it being one of the objects thereof to provide a filter equipped with a removable heel leaf.

Another object of my invention is to provide a filter of the foregoing described character equipped with means for facilitating quick removal of the filter pack whereby not only to permit cleaning of the tank before appreciable solidification of the material remaining therein but also fast removal of the heel leaf for peeling or stripping and adequate cleaning of the sump before any appreciable solidification of material obtains therein.

A further object of my invention is to provide a filter of the foregoing described character wherein the filter pack may be expeditiously shifted out of the tank in a unitary manner to permit removal and replacement of the heel leaf and the pack reshifted therein in those instances where it is not necessary to strip or peel the leaves of the pack as frequently as the heel leaf.

A still further object of my invention is to provide a filter of the foregoing described character wherein fluid may be filtered by the pack and the heel leaf in a sequential manner to constitute the filtering cycle previous to removing the residue and opening of the door thereby minimizing operational time with a resultant decrease of production cost and waste.

An important object of my invention is to provide a method of filtering fluid in a manner to effect sequential filtering of the residue as a component of a filtering operation or cycle.

Another important object of my invention is to provide a filter of the foregoing described character which is simple in construction, durable in use, efficient in operation and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a perspective view of the filter with the door closed.

Figure 2 is a similar view with the door opened and leaves of the pack shifted out of the tank.

Figure 4 is a top plan view of the filter and vat with certain components being removed.

Figure 5 is a side elevation partly in section, of the filter.

Figure 6 is a plan view of the heel leaf.

Figure 7 is a sectional view taken on the line 7—7 of Figure 6.

Figure 8 is a sectional view taken on the line 8—8 of Figure 6.

Figure 10 is a chart of the valve settings.

Figure 3:
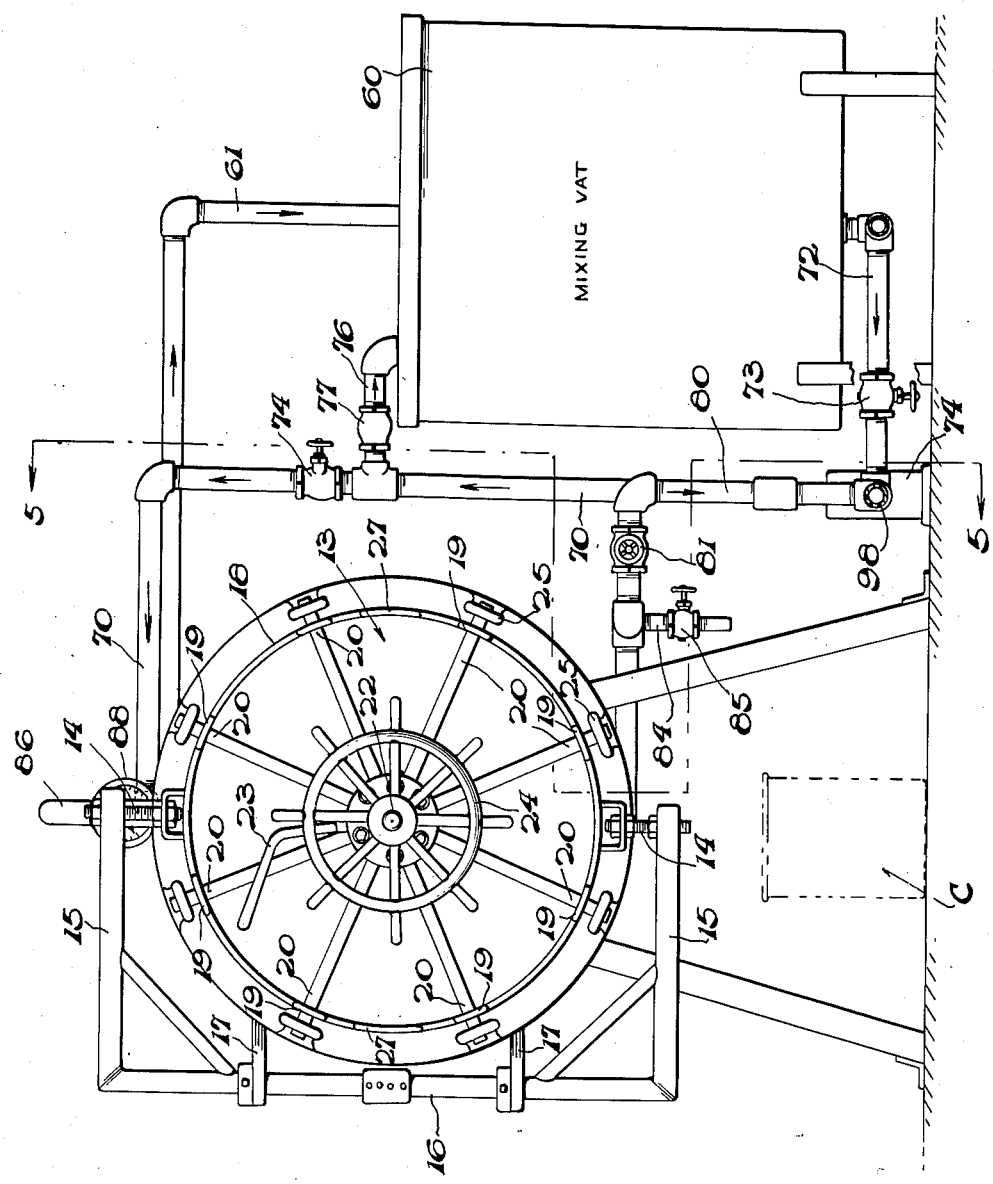
Figure 3 is a front elevation of the filter connected to a mixing vat.
Figure 9:
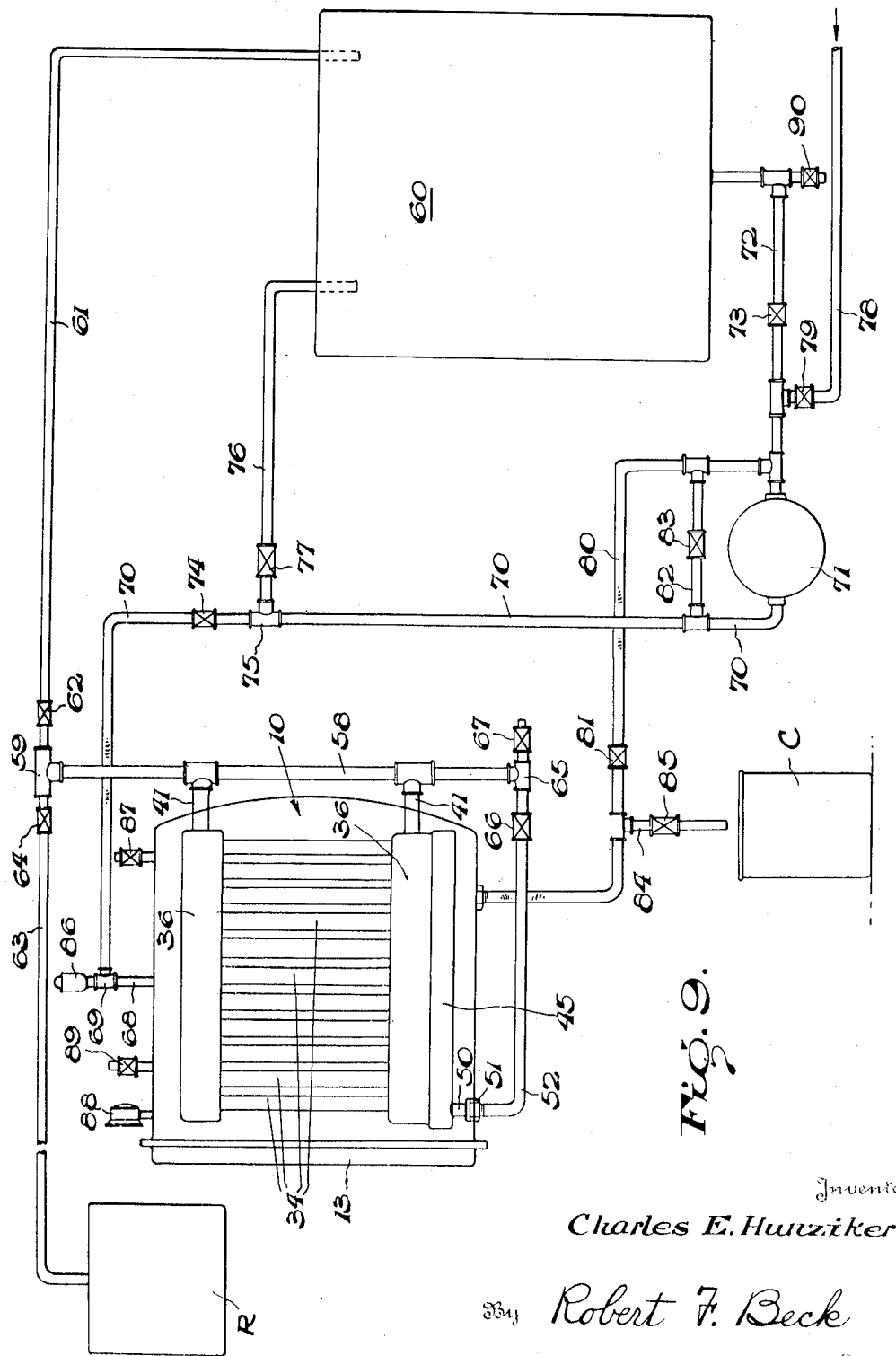
Figure 9 is a diagrammatic view of the connections between the filter and the mixing vat.

In practicing my invention, as illustrated in the drawings, I provide a filter comprising a tank, filter receptacle or shell 10 having a lower portion 9 and cylindrical side and recurvated rear walls 11 and 12, respectively, and an open front end closed by a door or cover 13. The door 13 is pivotly supported between and by upper and lower pivots 14 carried by upper and lower arms 15 of a frame formed with the pintle 16 of a hinge having its leaves 17 connected to the wall 11 of the shell 10.

The door is adapted to be readily operated to closed and open positions and may be rotated about the pivots 14 or, together with the pivots and pintle, about the leaves 17. The door is provided with an outwardly extending marginal ring or band 18 equipped with guides 19 through which extend the outer ends of bars 20 which, when the door is in closed position, effectively seals the door with the shell to preclude escape of fluid therefrom. The bars 20 are retractable and have their inner ends pivotly connected to the inner marginal radial face of a plate or disc 21 threaded on a spindle or stub-shaft 22 for partial rotation thereon and operated by a hand lever 23 fixed to the disc. The shaft 22 is mounted on the door and has threaded thereon, prejacent the disc 21, a hand wheel 24 for engaging the disc and clamping the latter in locked relation with the shaft when the door is closed.

The outer ends of the bars 20 slidably extend into wedging keepers or eyes 25 provided on a flange 26 carried by the shell when the disc is operated to the closed position for effecting sealing of the door. In this position, the rods are radially disposed relative to the disc and, when the disc has been operated to open and closed positions, the band 18 is provided with handles 27.

A pair of sectional longitudinally extending spaced rails or tracks 30 are each provided with detachable outer and fixed inner sections 31 and 32, respectively, with the latter being secured to the upper portion of the inner peripheral face of the wall 11. The tracks have slidably mounted thereon hooks or brackets 33 formed on the upper corners of the frames of a plurality of vertically disposed filter leaves 34 constituting filter apparatus or a filter pack, the frame of each leaf being provided with a pair of handles for facilitating removal and insertion of the leaf relative to the shell as hereinafter more fully described. The detachable outer sections 31 of the tracks have their inner ends, adjacent the inner sections 32, formed with hangers for detachable engagement with the flange 26 whereby to connect the inner and outer sections together in alignment when the door is in open position, the outer ends of the outer sections 31 being detachably connected to the upper ends of a pair of standards 35 as illustrated in Figure 2 of the drawings.

In the present embodiment of the invention, each leaf 34 is formed with upper and lower sleeves constituting discharge channels or conduits 36 for the pack and, within the confines of the frame, with a ternary of wire screens 37, the innermost or middle screen being relatively coarse and defining a trough or filtered liquid-receiving zone communicating with the conduits 36 by passages 38 formed in the adjacent portions of the frame. As disclosed in detail in my aforementioned United States Patent No. 2,381,453, horizontal tie rods 39 are connected to the wall 12 and extend through the conduits, the tie rods being equipped on their outer ends, adjacent the door and the outer ends of the outer sleeves, with closure caps 40 for closing the outer ends of the outer sleeves. Nuts are employed on the outer threaded ends of the tie rods 39 for securing the caps in sealed relation with the outer conduits and for coaction with the caps to secure the sleeves of the leaves together in sealed relation whereby fluid from the filtered fluid-receiving zones of the pack may be forced into pipes 41 extending through the rear wall and communicating with the conduits 36 without leakage.

As illustrated in Figure 5 of the drawings, the leaves 34 are suspended from the inner sections 32 of the tracks within the shell during operation of the filter, the outer sections 31 being detached to permit closing of the door and disposed in a convenient place, for instance, on the floor subjacent the shell. As illustrated in Figure 2 of the drawings, upon completion of a filtering operation, the door is actuated to open position and the sections 31 of the tracks are assembled with the standards 35 and the shell to align them with the sections 32. When the sections 31 and 32 have been thus assembled, the nuts and caps are removed and the pack shifted from the sections 31 onto the sections 32 outside the shell for purposes herein made apparent.

The lower portion 9 of the shell 10 constitutes a sump or zone for accumulating residue from the filtering operation carried out by the filter pack. Disposed in the sump 9 of the shell is a filter means or heel-leaf filter 45, the latter being of an arcuate configuration in cross-section to conform to the contour of the wall 11 and arranged in close proximity to the wall 11. The heel-leaf filter 45 comprises a liquid impervious body or plate 46 having its margins inwardly folded to provide an upper spaced flange 47 extending about the plate for securing to the plate a relatively coarse inner spacing screen 48 and a relatively fine filtering screen 49 overlying the spacing screen, the screens 48 and 49 constituting filter elements and with said spacing screen 48 defining a filtered liquid-receiving zone communicating with a nipple 50 which extends through the plate at the front of the latter and subjacent the flange 47 as illustrated in Figures 6 and 8 of the drawings.

The nipple 50 is removably connected to and extends within a coupling 51 carried by the shell and communicating with a pipe 52, the coupling being provided with a gasket for engaging the nipple to preclude leakage. Together, the elements 50, 51 and 52 constitute outlet means extending from the filtered liquid-receiving zone defined by the filter element 48 through the bottom of the sump 9. The shell is provided with a pair of front brackets 53 which overlie the front portion of the flange 47 and in which are threaded clamping bolts 54 for engaging the flange to maintain the nipple within the coupling. The rear of the shell is provided with a pair of rear brackets 55 which overlie and engage the flange, the under face of the rear of the margin of the plate being provided with a rest or support 56 for engaging the wall 11 and which coacts with the nipple 50 to maintain the leaf 45 in spatiality with the shell.

It will be seen, therefore, that the elements 53, 54, 55 and 56 constitute means detachably securing the heel-leaf filter to the tank in spaced relation to the bottom of the sump. Upon loosening of the bolts 54, the leaf 45 may be removed from the shell by raising the front a sufficient distance to effect withdrawal of the nipple from the coupling to allow the leaf to be shifted rearwardly, under the rear brackets, to clear the front brackets and thus permit further raising of the front of the leaf and its withdrawal from the shell over the front brackets. A reverse of the foregoing operation serves to effect installation of the leaf 45 within the shell for use.

In my filtering system, the pipes 41 are connected to a manifold or riser 58 having its upper end connected to a T 59 communicating, on one side, with the top of a mixing vat 60 by means of a pipe 61, the latter being provided with a valve 62 adjacent the T 59. The other side of the T 59 communicates with an outlet or supply pipe 63 provided with a valve 64 adjacent the T and which pipe 63 is employed for conveying the filtered fluid to a receptacle R or the like. The pipe 52 communicates with a T 65 connected to the lower end of the manifold 58 and, adjacent the T 65, is provided with a valve 66, the other side of the T 65 being provided with a vent valve 67.

The upper portion of the shell is provided with an inlet nipple 68 connected to a T 69 having one side communicating with a tank-feed pipe 70 leading from one side of a pump 71, the opposite side of the pump being connected to a pump-feed pipe 72 communicating with the bottom of the vat 60 and provided with a valve 73 between the vat and pump. The pump is of the type to permit filtering operations by low gravity pressure, low pump pressure or high pump pressure. The pipe 70, between the T 69 and the pump 71, is provided with a valve 74 and, between the latter and the pump, communicates, by means of a T 75, with a pipe 76 leading to the top of the vat, the pipe 76 being provided with a valve 77 adjacent the T 75. A fluid supply or inlet pipe 78 communicates with the pipe 72 adjacent the pump 71 and is provided with a valve 79 adjacent said pipe 72 whereby fluid may be supplied to the system from a supply source by the action of the pump. The pipe 72, between the pipe 78 and the pump 71, communicates, by means of a pipe 80, with the bottom of the shell for draining the latter by operation of the pump and which pipe 80 is provided with a valve 81. The pipe 80, between the pipe 72 and the valve 81, communicates with the pipe 70, adjacent the pump, by means of a pipe 82, provided with a valve 83 to form a bypass for fluid whereby pressure in the system is controlled. The pipe 80, between the shell and the valve 81, has connected thereto a drain pipe 84 provided with a valve 85 for draining the residue into a container or pail C when desired.

Besides the nipple 68 and the pipe 70, the T 69 has connected thereto a pressure-operated safety valve 86 to confine the pressure within the tank to a predetermined high value, while the tank is provided with a manually operated vent valve 87 for venting the tank and a gage 88 for indicating the pressure therein. The tank is also equipped with a manually operated air intake valve 89 which may be combined with the valve 87 to form a single unit, the valve 89 being adapted for connection to a compressed air source, for instance, a compressor or storage container, for supplying the tank with compressed air for a purpose hereinafter made apparent. The vat 60 is provided with a drain valve 90 to facilitate cleaning thereof.

In operation—assuming the door 13 of the tank 10 to be closed, the vat 60 supplied with fluid and a finely divided filtering material for suspension in the fluid, the pump operating, the valves 73 and 77 open and the remaining valves closed—the fluid and filtering material from the vat are circulated through the pipe 72, the pump 71, and pipes 70 and 76 to the vat. Due to the circulation, the filtering material is thoroughly divided within the fluid and remains in suspension therein, it being understood that the filtering material generally employed is of varying grades of asbestos, charcoal or other various filter aids, for example, diatomaceous earth. When the contents of the vat are thus mixed, valve 77 is closed and valves 62, 66, 74 and 87 are opened together with the valve 73 to effect circulation of the fluid and filtering material from and to the vat sequentially through the pipe 72, pump 71, pipe 70, nipple 68, leaves 34 and 35, conduits 36, pipes 41 and 52, manifold 58 and pipe 61 to precoat the leaves 34 and 45 with the filtering material. Upon precoating of the leaves 34 and 45, the valves 62, 66, 73 and 87 are closed and valves 64 and 79 are opened together with the valve 74 whereby fluid is then pumped from the pipe 78 through the pipe 72, pump 71, pipe 70, nipple 68, leaves 34, conduits 36, pipes 41, manifold 58 and outlet pipe 63 to the aforementioned receiver R, the fluid being filtered by the leaves 34 of the pack as it flows therethrough.

When the fluid has thus been filtered by the filtering pack, the valves 74 and 79 are closed preparatory to emptying the tank. However, in order to recover fluid from the residue contained in the sump, the valves 66 and 87 are opened together with the valve 64, the valve 87 serving to vent the tank. When the valves 64, 66 and 87 are thus opened and the pump rendered ineffective, for instance, by opening the valve 83, the valve 89 is opened to supply air to the tank whereupon fluid from the residue will be forced and filtered through the leaf 45 and through the pipes 52, manifold 58 and pipe 63 to the receiver R for mixing with the previously filtered fluid therein thus effecting recovery of fluid from the residue heretofore drained from the tank and often discarded.

In instances where the residue is of such a character as to be suitable for being pumped directly into the mixing vat for further treatment, the valves 64, 66, 83 and 87 are closed and the valves 77 and 81 are opened together with the valve 89 whereupon the residue is pumped to the vat by the pump 71. However, when the residue is of such a character as to preclude pumping to the mixing tank, the pump is rendered ineffective and the valves 77 and 81 closed and the valve 85 opened together with the valve 89 to effect drainage through the pipe 84 into the container or pail C thereunder, it being understood that the compressed air is supplied to the tank through the valve 89 to effect quick drainage. When the residue has thus been disposed of, the door is opened, the sections 31 and 32 of the tracks are assembled and the pack is quickly shifted out of the tank onto the sections 31 to permit access to the heel leaf 45 and cleaning of the tank as heretofore described. The chart illustrated in Figure 10 clearly indicates the settings of the various valves with respect to the essential steps in the operation of the system.

From the foregoing, it will be apparent that my invention provides a method and means whereby an appreciable quantity of fluid contained in the residue of the sump may be expeditiously filtered and recovered and that the filter pack may be quickly shifted to permit fast removal and peeling of the heel leaf and more frequently, if desired, than the leaves of the pack and the adequate cleaning of the sump before appreciable solidification of the residue.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined to the herein described use therefor, as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In a pressure-leaf filter, a tank having an open end, a filter pack having a plurality of leaves and normally disposed in said tank and coacting with the lower portion of said tank to define a sump, sump filtering means detachably mounted in said tank subjacent said pack above said sump and readily removable from said tank upon removal of said pack, tracks having outer and inner sections with the latter being disposed within and fixed to said tank, said leaves equipped with means for slidably mounting said pack on said tracks, a door for closing said end of said tank for sealing the latter during filtering operations, means connecting said pack and said filtering means together outside of said tank and including means for rendering said pack and said filtering means effective in a predetermined order for filtering liquid from outside of said tank and from said sump, respectively, said outer sections of said track being detached from said filter when said end is closed by said door and attached to said filter and extending outwardly from said tank and said inner sections for receiving said leaves when said door is opened, said door being of a quick opening type to permit quick shifting of said leaves from said inner sections to said outer sections to facilitate fast removal of said filtering means and cleaning of said sump.

2. In a pressure-leaf filter, a tank having a normally closed open end, a filter pack having a plurality of leaves and normally disposed in said tank and coacting with the lower portion of said tank to define a sump, sump filtering means detachably mounted in said tank subjacent said pack above said sump and readily removable from said tank upon removal of said pack, tracks having outer and inner sections with the latter being disposed within and fixed to said tank, said leaves equipped with means for slidably mounting said leaves on said tracks, means connecting said pack and said filtering means together outside of said tank and including means for rendering said pack and said filtering means effective in a predetermined order for filtering liquid from outside of said tank and from said sump, respectively, said sections of said track being detached when said end is closed and attached and extending outwardly from said tank and said inner sections when said end is open to permit quick shifting of said leaves from said inner sections to said outer sections to facilitate fast removal of said filtering means and cleaning of said sump.

3. In combination, a pressure-leaf filter tank having a filter pack and a sump subjacent said pack for accumulating residue from a filtering operation by said filter pack, a heel-leaf filter disposed within said sump, means detachably securing said heel-leaf filter to said tank in spaced relation to the bottom of the sump, said heel-leaf filter comprising an arcuate-shaped liquid impervious body and a plurality of filter elements overlying and secured to said body with one of said elements defining a filtered liquid-receiving zone between the adjacent element and said body, and outlet means extending from said zone through the bottom of said sump whereby a portion only of the residue in said sump is filtered through said elements.

4. In combination, a pressure-leaf filter tank having a filter pack and a sump subjacent said pack for accumulating residue from a filtering operation by said filter pack, a heel-leaf filter disposed within said sump, means detachably securing said heel-leaf filter to said tank in spaced relation to the bottom of the sump, said heel-leaf filter comprising a liquid impervious body and a plurality of filter elements overlying and secured to said body with one of said elements defining a filtered liquid-receiving zone between the adjacent element and said body, and outlet means extending from said zone through the bottom of said sump whereby a portion only of the residue in said sump is filtered through said elements.

5. In combination, a filter receptacle having filter apparatus and a zone subjacent said apparatus for accumulating residue from a filtering operation by said apparatus, filter means disposed within said zone, means detachably securing said filter means to said receptacle in spaced relation to the bottom of said zone, said filter means comprising a liquid impervious body, a plurality of filter elements overlying and secured to said body with one of said elements defining a filtered liquid-receiving zone between the adjacent element and said body, and outlet means communicating with said filtered liquid-receiving zone and extending out of said receptacle whereby a portion only of the residue in the first-mentioned zone is filtered through said elements.

References Cited in the file of this patent

UNITED STATES PATENTS

| | | |
|---|---|---|
| 617,029 | Koneman et al. | Jan. 3, 1899 |
| 699,211 | Mosher | May 6, 1902 |
| 846,585 | Lieberich | Mar. 12, 1907 |
| 1,547,368 | Dehne | July 28, 1925 |
| 2,013,776 | Weisman | Sept. 10, 1935 |
| 2,035,851 | Walker | Mar. 31, 1936 |
| 2,050,007 | Keith et al. | Aug. 4, 1936 |
| 2,221,210 | Soderquist | Nov. 12, 1940 |
| 2,278,453 | Kracklauer | Apr. 7, 1942 |
| 2,379,848 | Damme et al. | July 3, 1945 |
| 2,381,453 | Hunziker | Aug. 7, 1945 |
| 2,477,404 | Butt | July 26, 1949 |

FOREIGN PATENTS

| | | |
|---|---|---|
| 361,415 | France | June 22, 1906 |
| 290,425 | Germany | Feb. 26, 1916 |
| 692,438 | France | Nov. 5, 1930 |